United States Patent
Botsford, III et al.

[11] Patent Number: 5,646,687
[45] Date of Patent: Jul. 8, 1997

[54] TEMPORALLY-PIPELINED PREDICTIVE ENCODER/DECODER CIRCUIT AND METHOD

[75] Inventors: Nelson Botsford, III, Somerville; George John Kustka, Marlboro; John Norman Mailhot, Somerville, all of N.J.

[73] Assignee: Lucent Technologies Inc., Murray Hill, N.J.

[21] Appl. No.: 366,272

[22] Filed: Dec. 29, 1994

[51] Int. Cl.[6] ............................................. H04N 7/18
[52] U.S. Cl. .................. 348/402; 348/416; 348/415; 348/411; 348/721; 348/716
[58] Field of Search .......................... 348/721, 384, 348/402, 411, 415, 416, 419, 716, 717, 715

[56] References Cited

U.S. PATENT DOCUMENTS

| | | |
|---|---|---|
| 5,043,808 | 8/1991 | Knauer et al. . |
| 5,134,475 | 7/1992 | Johnston et al. . |
| 5,134,477 | 7/1992 | Knauer et al. . |
| 5,136,377 | 8/1992 | Johnston et al. . |
| 5,138,447 | 8/1992 | Shen et al. ............................... 348/416 |
| 5,144,423 | 9/1992 | Knauer et al. . |
| 5,168,361 | 12/1992 | Hackmann ............................... 348/721 |
| 5,170,259 | 12/1992 | Niihara ...................................... 348/416 |
| 5,231,484 | 7/1993 | Gonzales et al. . |
| 5,237,686 | 8/1993 | Asano et al. ............................. 395/650 |
| 5,247,363 | 9/1993 | Sun et al. . |
| 5,289,577 | 2/1994 | Gonzales et al. ....................... 395/163 |
| 5,291,281 | 3/1994 | Paik et al. ................................ 348/384 |
| 5,293,229 | 3/1994 | Iu . |
| 5,325,125 | 6/1994 | Naimpally et al. . |
| 5,331,348 | 7/1994 | Knauer et al. . |
| 5,434,629 | 7/1995 | Pearson et al. .......................... 348/721 |
| 5,461,679 | 10/1995 | Normille et al. ......................... 382/304 |
| 5,502,512 | 3/1996 | Toyoda et al. ............................ 348/721 |
| 5,532,744 | 7/1996 | Akiwumi-Assani et al. ............ 348/390 |

Primary Examiner—Amelia Au
Assistant Examiner—Anand S. Rao
Attorney, Agent, or Firm—Robert Rudnick

[57] ABSTRACT

A temporally-pipelined predictive encoder/decoder circuit for encoding or decoding an input signal containing a sequence of data frames received at a particular frame rate and frame data rate into an output signal having an equal frame rate employs a plurality of N predictive encoders/decoders. An input buffer may be used to extract the information for each data frame in the input signal and supply such information to a corresponding one of the encoders/decoders at rate of 1/N of the particular frame data rate. Each encoder/decoder generates corresponding encoded/decoded information as it is received as well as provides digitized frame information to the encoder/decoder processing the next received image frame. The encoded/decoded information is provided to corresponding frame buffers which temporarily store such information. Each one of the frame buffers is connected to respective inputs of a multiplexer, wherein the encoded/decoded information is provided to a multiplexer output to form the encoded/decoded output signal. When information for the entire frame has been stored by a frame buffer, the stored data information is provided to the multiplexer output to provide the portion of the output signal corresponding to that frame.

23 Claims, 3 Drawing Sheets

TEMPORALLY-PIPELINED PREDICTIVE ENCODER/DECODER CIRCUIT AND METHOD

FIELD OF INVENTION

The invention relates generally to predictive signal encoders and decoders, and more specifically, to video encoder and decoder circuits and methods using a staggered array of predictive encoder and decoder processors, respectively.

BACKGROUND OF THE INVENTION

Successive image frames contained within a television signal are often almost identical. Images broadcasted in television signals often do not change substantially from frame to frame resulting in a substantial correlation between the information of the two successive frames. Many systems have been devised to take advantage of this correlation by appropriately encoding the image based on predictive schemes to maintain a frame rate of the television signal while reducing the overall number of bits that are required to describe each image frame. Established encoded video signal formats for compression of video data for high definition television include the MPEG-1 and -2 standards described in, for example, U.S. Pat. Nos. 5,293,229 and 5,231,484, which are incorporated by reference herein.

A single encoder circuit possessing adequate processing speed to perform image prediction, such as motion estimation, from frame to frame and to encode each received image frame is very costly to manufacture. In order to minimize video encoder cost, multiple spatially-separated video encoder processors have been used, wherein each encoder performs the motion estimation for specific regions of an image frame and generates corresponding portions of the digital video signal for those regions. For example, four encoder processors have been used to perform motion estimation and generate the corresponding encoded video signal, wherein each encoder processor operates on a respective quadrant of a display partitioned into a matrix of two-by-two quadrants. Other partition arrangements consisting of vertical or horizontal stripes, fixed or moving have been proposed.

All known spatially-separated video encoding techniques share a common problem concerning motion estimation. When an object that appears in a first quadrant is encoded, it may be predicted from any one of the adjacent quadrants' previous frames if the object was in such quadrant and moving toward the first quadrant. As a consequence, picture information from the adjacent quadrants must be made available to the first quadrant encoder processor. Accordingly, picture information for each quadrant must be shared with its neighbor quadrant to provide adequate motion estimation throughout each image frame. Such an information sharing requirement significantly increases hardware and interconnection complexity and cost.

Known methods that avoid the sharing of picture information between quadrants require that motion estimation be constrained within quadrants or not performed at all in quadrant boundary regions. However, such methods cause undesirable visible artifacts in the coded picture. Known video decoders share much of the same problems as encoders.

Therefore, there is a recognized need for low cost video encoder and decoder circuits having reduced hardware and interconnection complexity.

SUMMARY OF THE INVENTION

According to one aspect of the present invention, an encoding circuit for processing an input signal having a particular frame rate and frame data rate into an encoded output signal having a substantially equal frame rate employs a plurality of N predictive encoders. An input buffer of the encoding circuit has an input for receiving the digital input signal and a plurality of N outputs. The plurality of N predictive encoders are arranged into a sequence, wherein each encoder has a signal input, a digitized frame information input, an encoded signal output and a digitized frame information output. The signal inputs of the encoders are connected to corresponding outputs of the input buffer. The digitized frame information outputs of the encoders are connected to the digitized frame information inputs of the respective next encoder in the sequence. The digitized information output of a last encoder in the sequence is connected to the digitized information input of a first encoder in the sequence. Each one of a plurality of N frame buffers has an input connected to a corresponding encoder processor output. A multiplexer has a plurality of N inputs and an output. Each of the multiplexer inputs is connected to a corresponding frame buffer output. The encoded output signal is generated at the multiplexer output.

According to a method of the present invention, the input buffer may supply the information of each received frame in a temporally-pipelined manner to the corresponding encoders at a data rate of at least 1/N the input signal date rate. Each encoder encodes the entire information frame at the rate such information is received and provides corresponding digitized frame information to the next encoder in the sequence. When encoded information for the entire frame has been stored by a frame buffer, the stored information is provided to the multiplexer output to generate a respective portion of the output signal corresponding to that frame. These steps are repeated sequentially by each one of the plurality of N encoders for the sequence of received image frames to generate each portion of the encoded output signal.

According to another aspect of the invention, a decoding circuit for decoding an encoded input signal having a particular frame data rate into a decoded output signal having a substantially equal frame rate may be configured and operate in a substantially identical manner to the encoding circuit. In the decoding circuit, the plurality of predictive encoders are replaced by a plurality of predictive decoders.

Since the invention temporally processes image frames, it eliminates the complex and costly processor interconnection arrangement in typical prior art spatial multi-processor configurations. Further, the invention may use lower cost predictive encoders and decoders having slower processing speeds to achieve the same processing performance as prior art encoding and decoding circuits. Also, since no encoder or decoder processor requires the storing of an entire frame of digitized frame information, only minimal memory is required to hold the information received from a predecessor processor. Thus, the present invention can be manufactured at lower cost.

Additional features and advantages of the present invention will become apparent by reference to the following detailed description and accompanying drawings.

DETAILED DESCRIPTION

Figure 1:
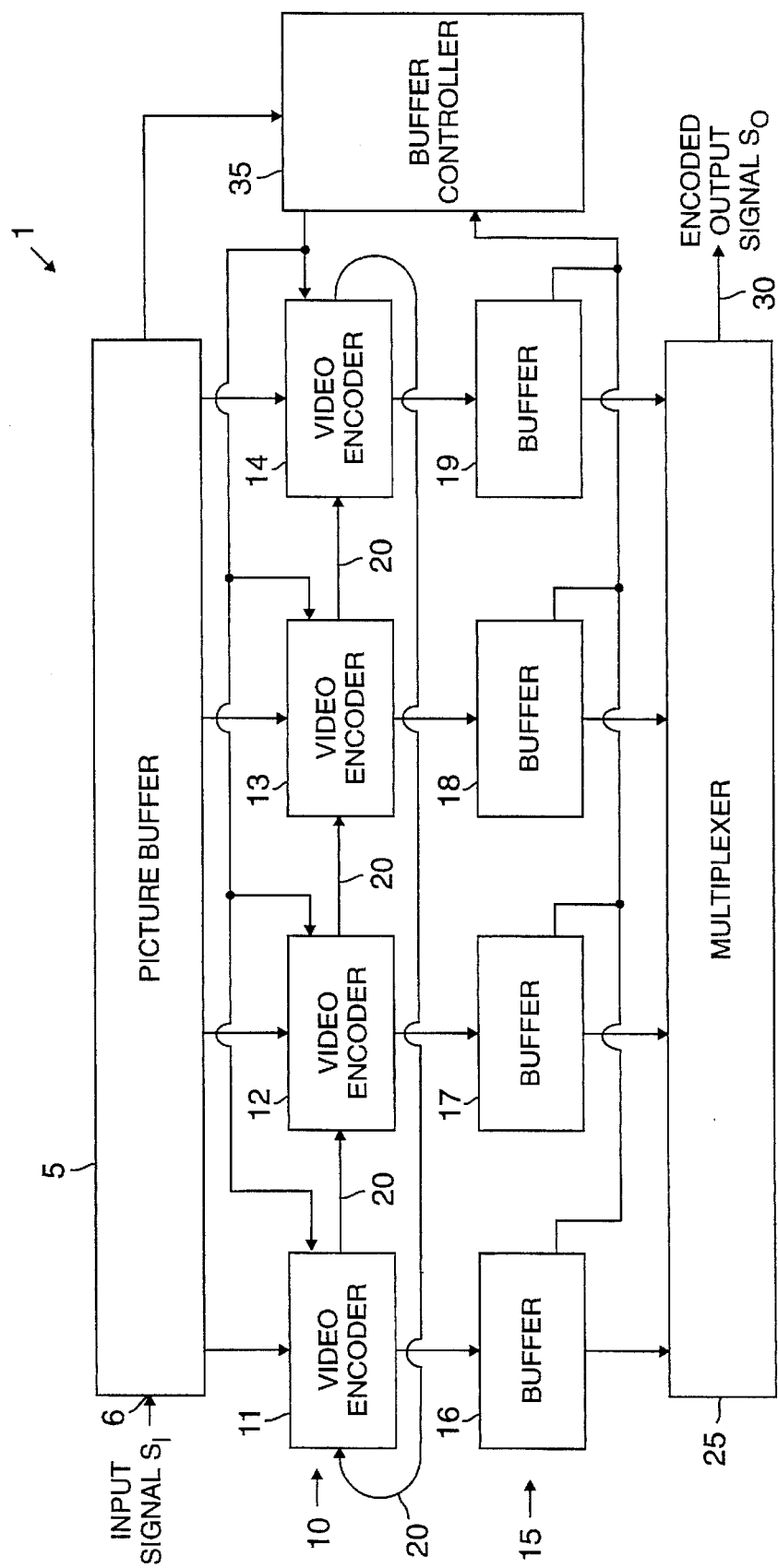
FIG. 1 is a schematic block diagram of an exemplary predictive encoder circuit according to the present invention.

An encoding circuit in accordance with the present invention is useful in generating encoded signals for many types of source signals, however, such circuit may be particularly useful in connection with the encoding of high definition television ("HDTV") signals. An exemplary encoding circuit 1 according to the present invention for converting an input signal, such as a digitized video signal $S_I$, to an encoded output signal, such as an HDTV video signal $S_o$, is shown in FIG. 1. To this end, the encoding circuit 1 may suitably be employed in an encoder section of an HDTV-type transmitter. The following description of the present invention with respect to an HDTV encoder is a presently preferred application and is not meant to be a limitation of the present invention.

The encoding circuit 1 includes an input buffer such as a picture buffer 5, a plurality of N predictive encoders 10, a corresponding plurality of frame buffers 15 and a multiplexer 25. The picture buffer 5 has an input 6 for receiving the digital input signal $S_I$ and is connected to each one of the encoders 10. Four encoders 11–14 are depicted in the encoder plurality 10 for ease of illustration purposes, and is not meant to be a limitation on the present invention. The encoders 11, 12, 13 and 14 are arranged into a sequence and are alternatively referred to as first, second, third and fourth encoders, respectively. An encoding circuit according to the present invention may have any number of video encoders greater than one.

Each one of the encoders 11–14 is connected to the next encoder in the sequence by a corresponding information signal line 20, for example, the signal line 20 connecting the first encoder 11 to the second encoder 12. The encoders 11–14 are further connected to corresponding frame buffers 16–19 of the buffer plurality 15. Each one of the frame buffers 16–19 is connected to the multiplexer 25 which generates the encoded output signal $S_o$ at an output 30. A buffer controller 35 may be connected to the picture buffer 5 and the frame buffers 16–19 to control each of the video encoders 11–14 in a manner described in greater detail below.

In operation, the digitized video signal $S_I$ which consists of information for a sequence of image frames is applied to the picture buffer 5. The picture buffer 5 sequentially extracts successive portions of the digitized video signal $S_I$ corresponding to the respective image frames. The extracted information for each image frame is provided to corresponding ones of the plurality of the encoders 10 in a temporally pipelined manner. A detailed discussion of an exemplary temporal pipeline process in accordance with the present invention is described in detail below with respect to FIG. 3.

Each one of the video encoders 10 generates encoded video information for the respective image frame supplied by the picture buffer 5. As each of the encoders 11–14 is generating encoded video information, that information is provided to the respective one of the frame buffers 16–19. Each one of the encoders 10 further provides corresponding digitized frame information over the corresponding information signal line 20 to the next encoder in the sequence that is encoding the next image frame of the input signal $S_I$.

The digitized frame information may suitably be reconstructed frame information generated from the corresponding encoded frame information, or the original digitized frame information received from the picture buffer 5, or a combination thereof. The digitized frame information is provided over the line 20 to the next encoder as it is generated. For instance, in FIG. 1, the picture buffer 5 continuously provides consecutive image frames of the input signal $S_I$ to the encoders 10 in the encoder order 11, 12, 13 and 14, such that the corresponding digitized frame information is transmitted over the respective signal lines 20 to the encoders 12, 13, 14 and 11, respectively.

Upon receipt and storage of encoded information for an entire image frame by one of the frame buffers 16–19, the multiplexer 25 connects the buffer to the output 30. When connected to the output 30, the frame buffers 16–19 provide the stored encoded frame information to the output 30 to form a respective portion of the output signal $S_o$ corresponding to that image frame. The frame buffers 16–19 receive encoded information for entire image frames in the order that the corresponding image frames are received by the encoders 11–14. Accordingly, the resulting sequence of encoded image frames at the multiplexer output 30 forms the encoded output signal $S_o$.

Image frame information is transmitted in the input signal $S_I$ at a particular frame rate, such as 60 frames per second. Within each frame portion of the signal $S_I$, image data is transmitted at a particular input frame data rate. The picture buffer 5 temporally pipelines such information to the encoders 10 by extracting the received information for each of the image frames and supplying the extracted information to a corresponding one of the encoders 10 at a data rate of 1/N times the input frame data rate, or one-fourth the input frame data rate for the exemplary encoding circuit 1, where the value N is four. In other words, the picture buffer 5 extracts frame information as it is received in the input signal $S_I$ and immediately, or after an appropriate fixed delay period, supplies it to a corresponding one of the encoders 10 at a data rate one-fourth that of the input frame data rate.

Since each one of the encoders 10 receives information at a data rate equal to one-fourth the input frame data rate, the portion of a given frame that is processed by a corresponding encoder during one frame interval is a region corresponding to one-fourth of the image frame. In such a manner, each one of encoders 10 will receive information for a corresponding frame over four frame intervals of the input signal $S_I$. As a consequence, each one of the encoders 10 receives frame information for every fourth image frame extracted from the input signal $S_I$. Also, any one of the encoders 10 encoding information for a particular region of an image frame will always be one-fourth portion of a frame ahead of the encoder that is encoding the next received image frame.

In order to generate the encoded signal for a particular region of an image frame, the predictive encoders 10 require the frame information for that region from the digitized input signal $S_I$ as well as digitized frame information for that region of the previous frame in the sequence. A suitable encoder 100 for use as one of the encoder processors 10 is described below with respect to FIG. 2. Since portions of a given frame are processed one-fourth portion of a frame ahead of the next image frame, the digitized frame information corresponding to a particular frame is produced substantially at the time it is needed by the corresponding one of encoders 10 processing that next image frame.

For example, if the encoder 11 begins receiving a first image frame at a given point in time, it will receive and process a first one-fourth portion of that frame at the point in time the picture buffer 5 starts providing information for the next image frame to the encoder 12. When the processor 12 starts processing the received information for the next image frame it will have the digitized frame information for the first one-fourth portion of the frame that was previously supplied by the encoder 11. Then, one frame interval later, the encoder 11 encodes and generates the digitized frame information for a second one-fourth portion of the frame. Accordingly, the digitized frame information for the second one-fourth portion is provided to the processor 12 at about the time it is receiving the information for the second one-fourth portion of its frame from the picture buffer 5. In this manner, digitized frame information is provided from one encoder to the next in a sequential fashion. A more detailed description of the operation of the encoding circuit 1 is provided below with respect to FIG. 3.

The buffer controller 35 is a processing unit such as a microprocessor, microcontroller, programmable logic array or application specific integrated circuit, that adjusts and controls the number of bits of information generated by the encoders 11–14 based on the fullness of the corresponding one of the frame buffers 16–19. In addition, the picture buffer 5 may perform pre-processing operations, such as filtering of the source image or computing picture complexity estimates, such as the variance of the frames. An algorithm performed by the buffer controller 35 may further utilize the picture complexity estimates provided by the picture buffer 5 as well as the fact that several image frames are being encoded simultaneously to avoid the temporal problems associated with buffer controller algorithms of single encoder systems that operate on one image frame at a time.

Figure 2:
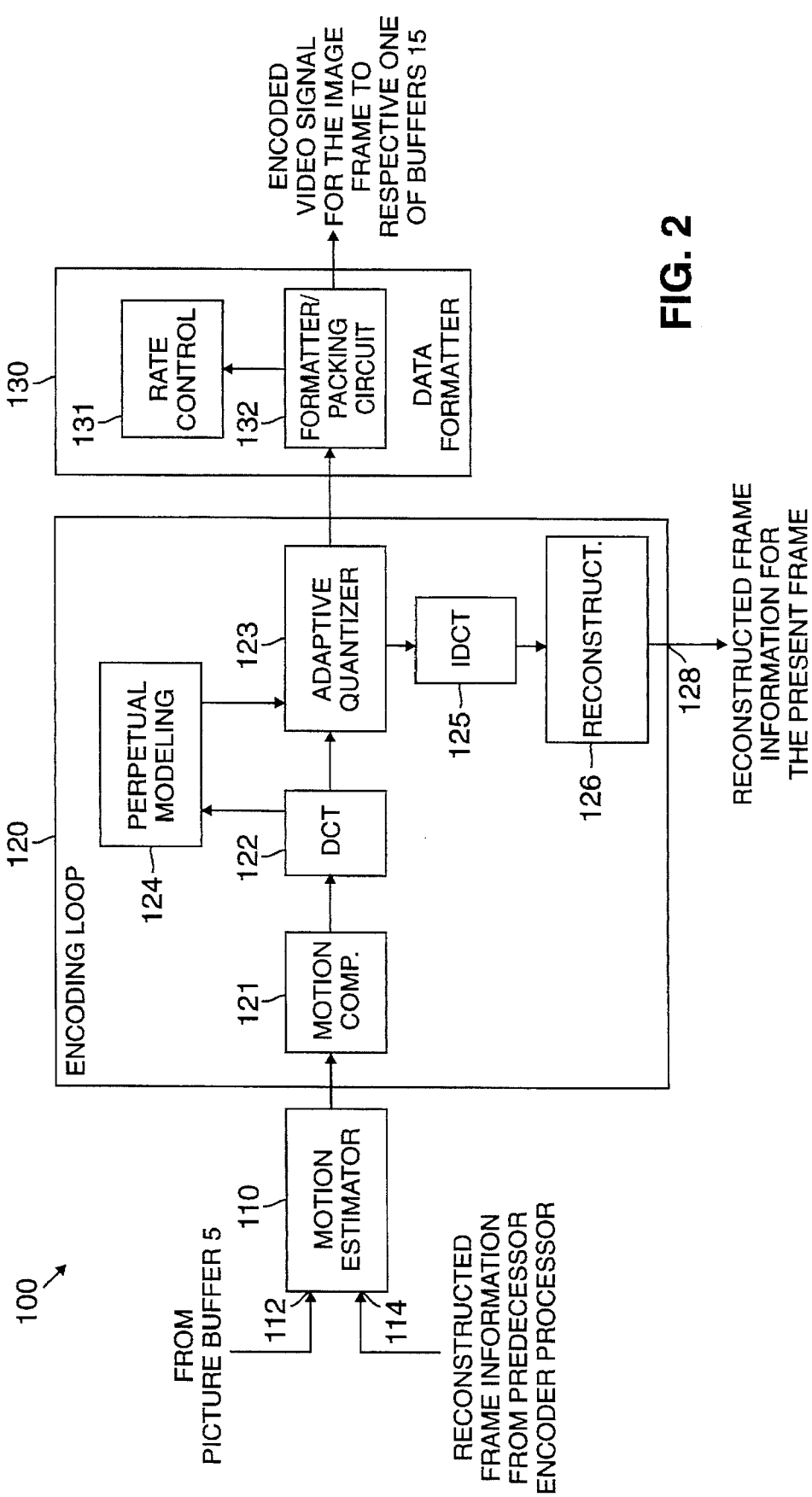
FIG. 2 is a schematic block diagram of an exemplary encoder processor that may be used in the encoder circuit of FIG. 1.

FIG. 2 illustrates an exemplary predictive encoder 100 which may be used as any of the encoders 10 in the encoding circuit 1 of FIG. 1 to encode a digitized video signal into a MPEG-formatted HDTV signal. Referring to FIG. 2, the encoder 100 includes a motion estimator circuit 110 connected to an encoding loop circuit 120 that is connected to an MPEG data formatter 130. The motion estimator circuit 110 receives image frame information from the picture buffer 5 at an input 112. The motion estimator circuit 110 also receives corresponding digitized frame information in the form of reconstructed frame information from a respective predecessor encoder at an input 114. The motion estimator 110 may further use the previous original frame information instead of or in combination with the reconstructed information. The motion estimator circuit 110 provides motion estimation data called motion vectors for the corresponding image frame to the encoding loop circuit 120.

The encoding loop circuit 120 generates encoded information for the image frame which is provided to the data formatter 130. Also, the encoding loop circuit 120 generates the reconstructed information for the corresponding present image frame at an output 128. The encoding loop circuit 120 is called a "loop" circuit because in prior art encoder circuits, reconstructed information was provided back to a motion compensator circuit in the loop circuit to provide the digitized frame information for the encoding of the next received image frame. Motion estimator and encoding loop circuits for HDTV applications are known in the art. Suitable motion estimation circuits 110 and encoding loop circuits 120 include those described in U.S. Pat. Nos. 5,134,475, 5,136,377, 5,144,423 and 5,331,348 ("AT&T patents"), which are assigned to the assignee of the present invention and incorporated by reference herein.

As shown in FIG. 2, the encoding loop circuit 120 may suitably include a motion compensator circuit 121 connected to a transform circuit such as a discrete cosine transform ("DCT") circuit 122 that is connected to an adaptive quantizer circuit 123. The adaptive quantizer 123 provides encoded information to the data formatter circuit 130 and is further connected to an inverse transform circuit such as inverse discrete cosine transform ("IDCT") circuit 125. The IDCT circuit 125 is connected to a reconstruction circuit 126 which generates the reconstructed frame information provided to the particular next encoder in the sequence. An optional perceptual modeling circuit 124 is connected to the DCT circuit 122 and the adaptive quantizer 123.

In operation, the motion compensator 121 receives the motion vector information from the motion estimator circuit 120 and combines this information with the reconstructed frame information received at the motion estimator input 114 to produce a displaced frame. Portions of the displaced frame that correspond to those portions of the image frame having no motion vectors may be represented by nulls. The displaced frame represents a prediction of the current frame's image. The motion compensator 121 then subtracts the displaced frame from the frame information received at the motion estimator input 112 to generate a displaced frame difference which is provided to the DCT circuit 122.

The displaced frame difference, the digitized frame information provided to the motion estimator input 114 as well as the frame information provided to the motion estimator input 112 are in a pixel based format. The DCT circuit 122 generates 2-dimensional transform domain information corresponding to the displaced frame difference provided by the motion compensator 121. The MPEG standard specifies performing a discrete cosine transform of the displaced frame difference, however, other transform circuits may be employed if an alternative encoding technique is used. The transform information generated by the DCT circuit 122 is provided to the adaptive quantizer 123 and the optional perceptual modeling circuit 124. The perceptual modeling circuit 124 modifies the quantization applied by the adaptive quantizer 123 based on statistical information gathered as the frame is encoded.

Encoded information generated by the adaptive quantizer 123 is provided to a formatter/packing circuit 132 of the data formatter 130. The formatter/packing circuit 132 encodes the transform information for the frame using variable length code (VLC) and run length code (RLC) techniques. Accordingly, the formatter/packing circuit 132 arranges the encoded signal into the required formatted data packets that makeup the output signal $S_o$ shown in FIG. 1. A rate control circuit 131 in the data formatter 130 may adjust the rate at which the adaptive quantizer 123 provides data to the formatter/packing circuit 132 based on signals from the formatter/packing circuit 132. Suitable data formatter circuits 130 are also described in detail in the above-cited AT&T patents.

The encoded displaced frame difference generated by the adaptive quantizer 123 is also converted back into a pixel based format by the IDCT circuit 125. The convened information is then reconstructed by the reconstruction circuit 126 into a format similar to the frame information provided to the motion estimator input 112 by adding back the displaced frame information computed by the motion compensator 121. The circuit 126 provides the generated reconstructed information to the encoding loop circuit output 128. The reconstructed information at the output 128 may be used as the digitized frame information by the encoder processing the next image frame of the input signal $S_I$.

Figure 3:
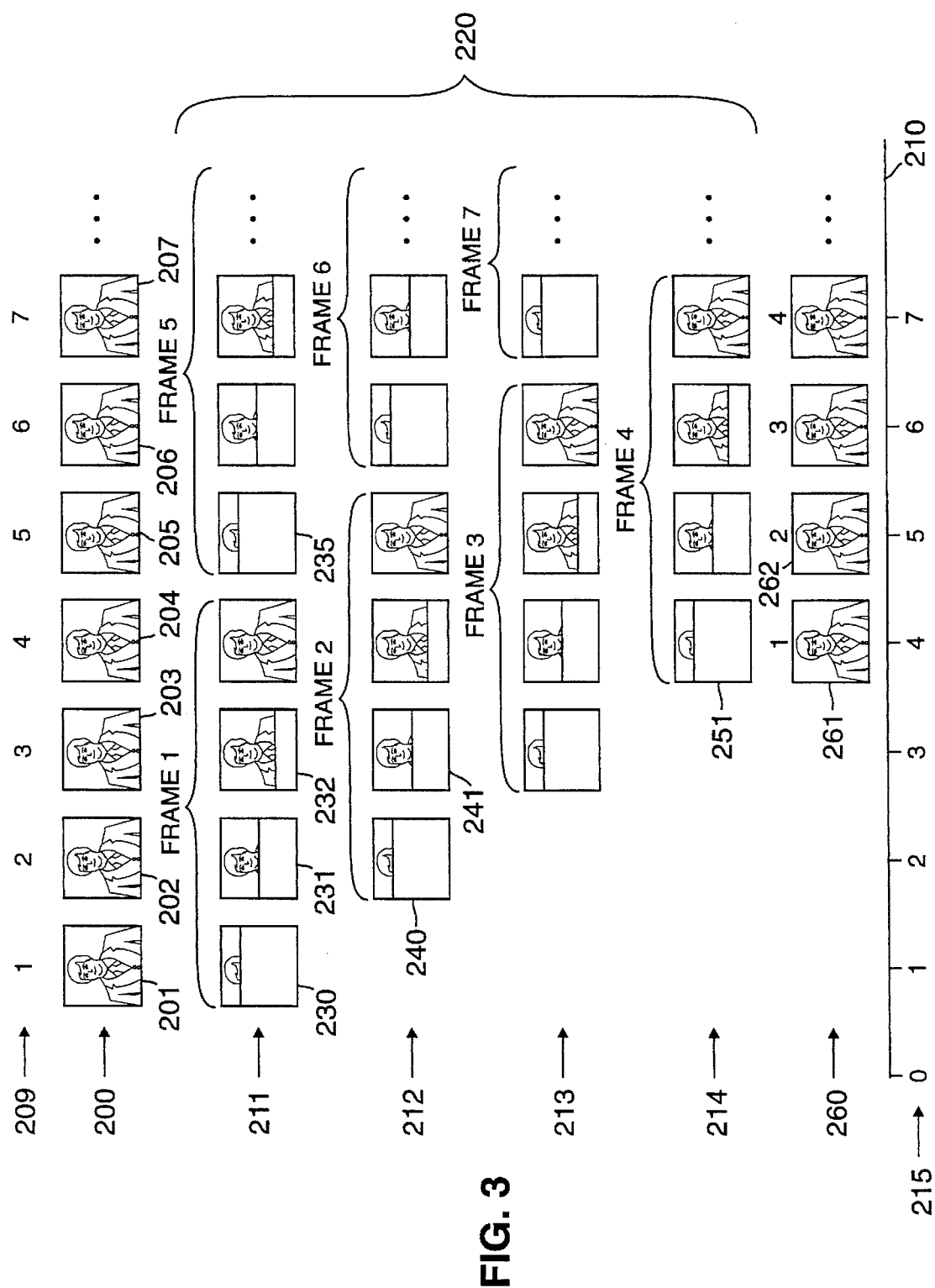
FIG. 3 is a graphic depiction of exemplary encoded video frames that may be generated during operation of the encoder circuit of FIG. 1.

FIG. 3 is a graphical depiction of exemplary encoded image frames at various time intervals during the temporal pipeline process of the encoding circuit 1 of FIG. 1. In FIG. 3, the image frames contained in the input source video signal $S_I$ that are extracted by the picture buffer 5 are represented by image blocks in a row 200 which are consecutively numbered by reference number 201–207. For ease of illustration, each of the image blocks 200 contains a substantially identical image. However, an actual video signal $S_I$ would typically contain image frames that are slightly different from one another. For example, a speaker's lips and facial muscles would move slightly during talking. Above the image blocks 200 are numbers 209 that correspond to the order in which the corresponding image frames are received by the picture buffer 5.

A time line 210 denotes the timing of events for the operation of the encoding circuit 1 based on the picture data rate at which the image frame information is transmitted in the input signal $S_I$. The time or frame interval corresponding to the points in time of receipt of each information frame by the frame picture buffer 5 is denoted by reference numbers 215 on the time line 210. For instance, a time 1 appearing on the time line 210 below the image block 201 indicates the receipt of the information for the first image frame. Note that if the frame data rate is 60 flames per second, then the duration between each time reference number 215 on the time line 210 would be ⅟₆₀ of a second. For discussion purposes, the image blocks 200 have been shown in columns directly over the time line reference numbers 215 and correspond to points in time when the information for the corresponding entire image frames are received. For instance, the information for the second frame is received by the picture buffer 5 over the interval between time references 1 and 2, and thus, the corresponding image block 202 is shown over the time reference 2.

Upon receipt of information for each frame in the input signal $S_I$, the picture buffer 5 supplies such information to a corresponding one of the encoders 11–14 at one-fourth the frame data rate of the input signal $S_I$. As the frame information is supplied to the encoders 11–14 by the picture buffer 5, each of the encoders 11–14 generates corresponding encoded information and provides digitized frame information to the encoder processing the next image frame in substantially real time. During each frame interval, each of the encoders 11–14 receives and encodes a respective frame region that is one-fourth portion of the frame information and provides digitized frame information for that region to the corresponding encoder. Regions of the image frames corresponding to the amount of encoded information generated by respective encoders 11–14 at various points in time are represented by image blocks 220. The image blocks 220 are shown in four rows 211, 212, 213 and 214 which correspond to the information generated by the respective encoders 11, 12, 13 and 14. Further, a row of image blocks 260 represents the encoded image frame information provided to the multiplexer output 30 to form the encoded output signal $S_o$.

During the first frame interval between times 0 and 1, the picture buffer 5 receives the entire information for the first image frame represented by the image block 201. As the first image frame information is received, the picture buffer 5 supplies it to the first encoder 11 at one-fourth the frame data rate. The encoder 11 processes the received frame information in substantially real time. As a result, at time 1, the first encoder 11 has received and encoded the first one-fourth portion of the received frame information. Accordingly, at time 1, a block 230 representing a processed region corresponding to a one-fourth portion of the first image frame 201 is shown in the row 211 for the first encoder 11. The encoded frame information is provided to the buffer 16, shown in FIG. 1, as it is generated by the encoder 11. Also, at time 1, the first encoder 11 provides the digitized frame information for the first one-fourth portion of the first image frame 201 to the second encoder 12 via the signal line 20 shown in FIG. 1.

Then, during the second frame interval between times 1 and 2, the picture buffer 5 supplies the first encoder 11 with the second one-fourth portion of the received first frame information 201. Accordingly, at time 2, the first encoder 11 has received and encoded the frame information for one-half of the first image frame 201 as indicated by image block 231 in the block row 211. Also at time 2, first encoder 11 has provided the digitized frame information for the second one-fourth portion of the image frame 201 to the second encoder 12. Further, during the second frame time interval between times 1 and 2, the picture buffer 5 receives and extracts the information for entire second image frame 202 and supplies the second encoder 12 with the first one-fourth portion of the received second frame information. Since, the first encoder 11 has previously provided the digitized frame information for this region, the encoder 12 generates the encoded information for this first one-fourth portion of the frame at time 2 as is illustrated by image block 240 at time 2 in the block row 212. During this time interval, the second encoder 12 also provides digitized frame information for the first one-fourth portion of the second image frame 202 to the third encoder 13.

Since the second encoder 12 has received the digitized frame information for the second one-fourth portion of the frame from the encoder 11, the second encoder 12 has the necessary information to encode the second one-fourth portion of the frame 202 when the corresponding information is received from the picture buffer 5 during the frame interval between times 2 and 3. Also, during the time interval between times 2 and 3, the first encoder 11 receives and encodes the received information for the third one-fourth portion of the first image frame 201, and provides the digitized frame information for that portion to the second encoder 12. This is indicated by the image block 232 in the block row 211 at time 3.

In this manner, as is illustrated in FIG. 3, the first encoder 11 requires four frame intervals to generate the encoded information for the first image frame 201 as represented by the image block 233 in block row 211 at time 4. At time 4, the buffer 16 contains the encoded information for the entire first image frame 201. As a consequence, the output multiplexer 25 connects the buffer 16 to its output 30 and the buffer 16 provides the encoded information to the multiplexer output 30 to form the portion of the encoded output signal $S_o$ that corresponds to the first frame. This is represented by encoded output image block 261 in the output block row 260 at time 4. Likewise, at time interval 5, the buffer 17 of the second encoder 12 contains the encoded information for the entire second image frame 202 and the multiplexer 25 connects it to the output 30 to provide the encoded data to the output 30 to form the corresponding portion of the encoded output signal $S_o$ for that second image frame 202. The portion of the output signal $S_o$ corresponding to the second encoded image frame is represented by encoded output image block 262 in the block row 260 at time 5.

This process is repeated by the picture buffer 5 and encoders 11–14 for each of the received first four image frames 201–204. When each one of the encoders 10 has completed the generation of encoded information for a given frame and storing such information in the corresponding frame buffer 16–19, the multiplexer 25 connects the corresponding frame buffer 16–19 to the output 30 to generate the corresponding portion of the encoded output signal $S_o$. As a result, the encoding circuit 1 generates an encoded output signal $S_o$ that contains a sequence of encoded image frames at a frame rate equal to the frame rate of the input signal $S_I$ while the processing of each frame occurs over four frame intervals.

After the first frame is read out of the buffer 16 at time 4, the picture buffer 5 begins to provide the fifth image frame 205 to the corresponding first encoder 11. The digitized frame information for the fourth frame 204 is provided by the fourth encoder 14 in a substantially identical manner as that described above based for the processing of that frame as represented by an image block 251 in the block row 214. The corresponding encoded information for the first one-fourth portion of the fifth image 205 generated at time 5 is represented by an image block 235 in the respective block row 211.

As FIG. 3 illustrates, the encoding circuit 1 operates the first encoder 11 such that it processes the received frame information one-fourth portion ahead of the processing of the corresponding portion of the next frame by the second processor 12. In this manner, the digitized frame information for the first one-fourth portion of the image frame is available when the second processor 12 requires it. Likewise, the other encoders 12, 13 and 14 process their frame information so that each remains one-fourth of a frame portion ahead of the processing of the corresponding portion of the next frame by the respective processors 13, 14 and 11. Although FIG. 3 represents the operation of the picture buffer 5 as instantaneously initiating the supply of frame information to the encoders 11–14 upon receipt of such information from the input signal $S_I$, the picture buffer 5 may alternatively provide the received information to the corresponding encoders 10 after a fixed delay interval.

Since the encoders receive digitized frame information for respective portions of frames as it is needed, none of the encoders 10 require sufficient memory to store an entire frame of digitized frame information. Each one of the encoders 11–14 only requires the minimal memory required to hold a portion of the digitized frame information received from a predecessor one of encoders 10 until it is processed. Thus, the present invention achieves an advantage over prior art encoding circuits employing a single processor which require sufficient high-speed memory to store the digitized frame information for an entire frame. The present invention achieves a further advantage over typical encoding circuits which use multiple encoders to spatially process respective portions of a frame by eliminating the complex and costly processor interconnection arrangement. Yet another advantage of the encoding circuit 1 over these prior art circuits is that slower and lower cost encoders can be used to achieve the same processing performance.

Although the present invention has been described above with the use of four encoders 11–14, the present invention may use any number of encoders greater than one. The larger the number of employed encoders the more time each encoder has to encode its frame information. For example, if five encoders are used, then the corresponding picture buffer would temporally-pipeline input signal information at a rate of ⅕ the input signal data frame rate. As a result, each one of the five encoders would have five frame intervals to generate encoded information for each frame. In an analogous manner, if six encoders are used then each encoder will have six frame intervals to generate encoded information for each frame. Thus, as the number of encoders increase, the required processing speed of the encoder employed may be decreased.

The following Table A lists suitable numbers of encoders and required processing speeds to generate encoded MPEG-formatted information for the listed frame sizes and frame rates.

TABLE A

| Number of Encoders | Processing Speed (Mblks/sec/processors where 1 Mblk = 16 × 16 pixels) | Pixels (mblks) Per Row | Sreen Size Pixels (Mblks) Per Column | Frame rate (frames per second) |
|---|---|---|---|---|
| 6 | 36,000 | 1280 (80) | 720 (45) | 60 |
| 5 | 38,800 | 1728 (108) | 960 (60) | 30 |
| 6 | 39,600 | 1920 (120) | 1056 (66) | 30 |
| 6 | 38,400 | 2048 (128) | 1152 (72) | 25 |

A decoding circuit in accordance with the present invention may be constructed and operate in an identical manner as the encoder circuit 1 of FIG. 1, except that predictive decoders would replace the encoders 10. Also, the input signal $S_I$ would be an encoded video signal while the output signal generated by the multiplexer 25 would be a decoded video signal and the digitized frame information provided by one decoder to the next would be in an encoded format. A suitable predictive decoder which may be used in a decoder circuit in accordance with the present invention is disclosed in U.S. Pat. No. 5,134,477, assigned to the assignee of the present invention, which is incorporated by reference herein.

Although several embodiments of temporally-pipelined encoding/decoding circuits according to the present invention have been described in detail above, many modifications are possible to the described embodiments without departing from the teaching of the present invention. All such modifications are intended to be encompassed by the present invention. For instance, the temporally-pipelined staggered encoder circuit may be used for encoding or decoding video signals in a format other than the MPEG standard, such as NTSC image frames or teleconferencing video pictures. In encoding or decoding such picture images, an array of conventional digital signal processing devices implementing the appropriate software may be used as the encoders or decoders. Also, the temporally staggered encoders and decoders may be used to code and decode voice, audio and other digital information.

We claim:

1. An encoding circuit for processing a digital input signal containing a sequence of data frames at a particular frame rate and frame data rate into an encoded output signal having a substantially equal frame rate comprising:

an input buffer having an input and a plurality of N outputs, the input operable to receive the digital input signal;

a plurality of N predictive encoders arranged in a sequence, each encoder having a signal input, a predictive signal input, an encoded signal output and a digitized frame information output, the signal inputs of the encoders being connected to a respective one of the input buffer outputs, the digitized frame information output being connected to the digitized frame information input of a next encoder in the sequence, wherein the digitized frame information output of a last encoder in the sequence is connected to the digitized frame information input of a first encoder in the sequence;

a plurality of N frame buffers, each frame buffer having an input and an output, each frame buffer input being connected to a corresponding encoded signal output of an encoder; and a multiplexer having an output and a plurality of N inputs, each input being connected to a corresponding frame buffer output, wherein the input buffer supplies each received information frame of the input signal in a temporally pipelined manner to a corresponding one of the encoders at a rate of 1/N the frame data rate and wherein each encoder encodes the entire information frame at the 1/N data rate as such information is received, and provides corresponding predictive information for a next frame to the digitized frame information input of the next encoder in the sequence.

2. The circuit of claim 1, further comprising:
a buffer controller connected to each one of the plurality of encoders and frame buffers, wherein the buffer controller adjusts a data rate of the information generated by each of the encoders based on data fullness of the associated frame buffer.

3. The circuit of claim 2, wherein the buffer controller is further connected to the input buffer and wherein the input buffer is operable to determine and provide data complexity information concerning the frames of the input signal to the buffer controller for use in adjusting the data rate.

4. The circuit of claim 1, wherein the input signal is a digitized video signal.

5. The circuit of claim 4, wherein each encoder is operable to generate reconstructed frame information for the digitized frame information.

6. The circuit of claim 5, wherein each of the encoders comprises: a motion estimator having a signal input, a reconstructed information input and an output, the signal input being the encoder input;

an encoding loop circuit having an input, an encoded data output and a reconstructed information output, the input being connected to the motion estimator output, the reconstructed information output being connected to the reconstructed information input of the motion estimator of the next encoder in the sequence; and a data formatter having an input and an output, the input being connected to the encoded data output of the encoding loop circuit and the output being the encoder encoded signal output.

7. The circuit of claim 6, wherein each of the encoding loop circuits comprises:

a motion compensator having an input and an output, the input being the signal input of the encoding loop circuit;

a transform circuit having an input and an output, the input being connected to the motion compensator output;

an adaptive quantizer having an input and first and second encoded data outputs, the input being connected to the transform circuit output, and the first encoded data output being the encoding loop circuit encoded data output;

an inverse transform circuit having an input and an output, the input being connected to the adaptive quantizer second encoded information output; and a reconstruction circuit having an input and a reconstructed information output, the input being connected to the inverse transform circuit output and the reconstructed information output being the encoding loop circuit reconstructed information output.

8. The circuit of claim 7, wherein the transform circuit is a discrete cosine transform circuit and the inverse transform circuit is an inverse discrete cosine transform circuit.

9. The circuit of claim 7, wherein the data formatter comprises:

a formatter/packing circuit having an input and an output, wherein the input and the output are the input and output of the data formatter; and a rate control circuit connected to the formatter/packing circuit and the adaptive quantizer of the encoding loop circuit.

10. A decoding circuit for processing an encoded digital input signal containing a sequence of data frames at a particular frame rate and frame data rate into a decoded output signal at a substantially equal frame rate comprising:

an input buffer having an input and a plurality of N outputs, the input operable to receive the digital input signal;

a plurality of N predictive decoders arranged in a sequence, each decoder having a signal input, a digitized frame information input, a decoded signal output and a digitized frame information output, the signal inputs of the decoders being connected to a respective one of the input buffer outputs, the digitized frame information output being connected to the digitized frame information input of a next decoder in the sequence, wherein the digitized frame information output of a last decoder in the sequence is connected to the digitized frame information input of a first decoder in the sequence;

a plurality of N frame buffers, each frame buffer having an input and an output, each frame buffer input being connected to a corresponding decoded signal output of a decoder; and a multiplexer having an output and a plurality of N inputs, each input being connected to a corresponding frame buffer output, wherein the input buffer supplies each received information frame of the input signal in a temporally pipelined manner to a corresponding one of the decoders at a rate of 1/N the frame data rate and wherein each decoder decodes the entire information frame as such information is received, and provides corresponding digitized frame information for a next frame to the digitized frame information input of the next decoder in the sequence.

11. The circuit of claim 10, further comprising:
a buffer controller connected to each one of the plurality of decoders and frame buffers, wherein the buffer controller adjusts data rate of the information generated by each of the decoders based on data fullness of the associated frame buffer.

12. The circuit of claim 10, wherein the decoded output signal is a digitized video signal.

13. The circuit of claim 10, wherein each decoder is operable to generate reconstructed encoded frame information for the digitized frame information.

14. A method for processing a digital input signal containing a sequence of data frames at a particular frame rate and frame data rate into an encoded output signal having an equal frame rate using a plurality of N encoders comprising:

extracting the data corresponding to each received data frame in the input signal;

sequentially processing each extracted data frame along with digitized frame information of a previous frame at a data rate of 1/N the frame data rate of the input signal using a sequence of a plurality of N encoders, wherein the digitized frame information is generated by a previous encoder in the sequence, and wherein the processing produces encoded data corresponding to the data frame as well as digitized frame information for the data frame;

storing the encoded information for each data frame as it is processed;

supplying the produced digitized frame information to a next encoder in the sequence of encoders; and multiplexing the stored encoded information when an entire data frame has been encoded and stored to produce corresponding sequential frame portions of the encoded output signal.

15. The method of claim 14, wherein the encoding method encodes digitized video signal to an encoded video signal.

16. The method of claim 15, wherein the digitized frame information generated by the step of processing each of the extracted data frames is reconstructed frame information.

17. A method for processing an encoded input signal containing a sequence of data frames at a particular frame rate and frame data rate into a digital output signal having an equal frame rate using a plurality of N decoders comprising:

extracting the data corresponding to each received encoded data frame in the input signal;

sequentially processing each extracted data frame along with digitized frame information of a previous frame at a data rate of 1/N the frame data rate using a sequence of a plurality of N decoders, wherein the digitized frame information is generated by a previous decoder in the sequence, and wherein the processing produces decoded data corresponding to the data frame as well as digitized frame information for the data frame;

storing the decoded information for each data frame as it is processed;

supplying the produced digitized frame information to a next decoder in the sequence of decoders; and multiplexing the stored decoded information when an entire data frame has been decoded and stored to produce corresponding sequential frame portions of the decoded output signal.

18. The method of claim 17, wherein the decoding method decodes an encoded video input signal to a decoded output video signal.

19. The method of claim 18, wherein the digitized frame information generated by the step of processing the extracted data frames is reconstructed encoded frame information.

20. An encoding circuit for processing a digital input signal containing a sequence of data frames at a particular frame rate and frame data rate into an encoded output signal having a substantially equal frame rate comprising:

an input buffer having an input and a plurality of N outputs, the input operable to receive the digital input signal;

a plurality of N predictive encoders arranged in a sequence, each encoder having a signal input, a predictive signal input, an encoded signal output and a digitized frame information output, the signal inputs of the encoders being connected to a respective one of the input buffer outputs, the digitized frame information output being connected to the digitized frame information input of a next encoder in the sequence, wherein the digitized frame information output of a last encoder in the sequence is connected to the digitized frame information input of a first encoder in the sequence;

a plurality of N frame buffers, each frame buffer having an input and an output, each frame buffer input being connected to a corresponding encoded signal output of an encoder;

a multiplexer having an output and a plurality of N inputs, each input being connected to a corresponding frame buffer output, wherein the input buffer supplies each received information frame of the input signal in a temporally pipelined manner to a corresponding one of the encoders at a rate of 1/N the frame data rate and wherein each encoder encodes the entire information frame at the 1/N data rate as such information is received, and provides corresponding predictive information for a next frame to the digitized frame information input of the next encoder in the sequence; and a buffer controller connected to each one of the plurality of encoders and frame buffers, wherein the buffer controller adjusts a data rate of the information generated by each of the encoders based on data fullness of the associated frame buffer, and wherein the buffer controller is further connected to the input buffer and wherein the input buffer is operable to determine and provide data complexity information concerning the frames of the input signal to the buffer controller for use in adjusting the data rate.

21. A decoding circuit for processing an encoded digital input signal containing a sequence of data frames at a particular frame rate and frame data rate into a decoded output signal at a substantially equal frame rate comprising:

an input buffer having an input and a plurality of N outputs, the input operable to receive the digital input signal;

a plurality of N predictive decoders arranged in a sequence, each decoder having a signal input, a digitized frame information input, a decoded signal output and a digitized frame information output, the signal inputs of the decoders being connected to a respective one of the input buffer outputs, the digitized frame information output being connected to the digitized frame information input of a next decoder in the sequence, wherein the digitized frame information output of a last decoder in the sequence is connected to the digitized frame information input of a first decoder in the sequence;

a plurality of N frame buffers, each frame buffer having an input and an output, each frame buffer input being connected to a corresponding decoded signal output of a decoder;

a multiplexer having an output and a plurality of N inputs, each input being connected to a corresponding frame buffer output, wherein the input buffer supplies each received information frame of the input signal in a temporally pipelined manner to a corresponding one of the decoders at a rate of 1/N the frame data rate and wherein each decoder decodes the entire information frame as such information is received, and provides corresponding digitized frame information for a next frame to the digitized frame information input of the next decoder in the sequence; and a buffer controller connected to each one of the plurality of encoders and frame buffers, wherein the buffer controller adjusts a data rate of the information generated by each of the encoders based on data fullness of the associated frame buffer, and wherein the buffer controller is further connected to the input buffer and wherein the input buffer is operable to determine and provide data complexity information concerning the frames of the input signal to the buffer controller for use in adjusting the data rate.

22. A method for processing a digital input signal containing a sequence of data frames at a particular frame rate and frame data rate into an encoded output signal having an equal frame rate using a plurality of N encoders comprising:

extracting the data corresponding to each received data frame in the input signal;

sequentially processing each extracted data frame along with digitized frame information of a previous frame at a data rate of 1/N the frame data rate of the input signal using a sequence of a plurality of N encoders, wherein the digitized frame information is generated by a previous encoder in the sequence, and wherein the processing produces encoded data corresponding to the data frame as well as digitized frame information for the data frame;

storing the encoded information for each data frame as it is processed; supplying the produced digitized frame information to a next encoder in the sequence of encoders;

multiplexing the stored encoded information when an entire data frame has been encoded and stored to produce corresponding sequential frame portions of the encoded output signal;

determining picture complexity estimates; and adjusting a data rate of the information generated by each of the encoders based on picture complexity estimates and a number of bits generated that have been previously stored for that data frame.

23. A method for processing an encoded input signal containing a sequence of data frames at a particular frame rate and frame data rate into an encoded output signal having an equal frame rate using a plurality of N decoders comprising:

extracting the data corresponding to each received encoded data frame in the input signal;

sequentially processing each extracted data frame along with digitized frame information of a previous frame at a data rate of 1/N the frame data rate using a sequence of a plurality of N decoders, wherein the digitized frame information is generated by a previous decoder in the sequence, and wherein the processing produces decoded data corresponding to the data frame as well as digitized frame information for the data frame;

storing the encoded information for each data frame as it is processed;

supplying the produced digitized frame information to a next decoder in the sequence of decoders;

multiplexing the stored decoded information when an entire data frame has been decoded and stored to produce corresponding sequential frame portions of the decoded output signal;

determining picture complexity estimates; and adjusting a data rate of the information generated by each of the decoders based on the picture complexity estimates and a number of bits generated that have been previously stored for that data frame.

* * * * *